(12) United States Patent
Sonnendorfer et al.

(10) Patent No.: US 8,136,275 B2
(45) Date of Patent: Mar. 20, 2012

(54) DISPLAY ELEMENT FOR ATTACHING ADVERTISING TO THE HANDLE OF A SHOPPING CART

(76) Inventors: Horst Sonnendorfer, Puchheim (DE); Franz Wieth, Puchheim (DE)

( * ) Notice: Subject to any disclaimer, the term of this patent is extended or adjusted under 35 U.S.C. 154(b) by 0 days.

(21) Appl. No.: 12/597,639

(22) PCT Filed: Jul. 12, 2007

(86) PCT No.: PCT/DE2007/001260
§ 371 (c)(1),
(2), (4) Date: Oct. 26, 2009

(87) PCT Pub. No.: WO2008/128490
PCT Pub. Date: Oct. 30, 2008

(65) Prior Publication Data
US 2010/0058633 A1     Mar. 11, 2010

(30) Foreign Application Priority Data
Apr. 24, 2007   (DE) ..................... 20 2007 005 978 U

(51) Int. Cl.
| G09F 3/00 | (2006.01) |
| G09F 3/18 | (2006.01) |
| G09F 3/20 | (2006.01) |
| G09F 15/00 | (2006.01) |
| G09F 15/02 | (2006.01) |
| G06M 1/02 | (2006.01) |
| H01H 13/702 | (2006.01) |

(52) U.S. Cl. ........... 40/308; 40/660; 40/650; 40/607.03; 235/1 D; 235/1 R; 280/33.992
(58) Field of Classification Search .................... 40/308, 40/660, 607.03; 235/1 D, 1 R; 280/33.992
See application file for complete search history.

(56) References Cited

U.S. PATENT DOCUMENTS
| 5,301,443 A * | 4/1994 | Gori ................................ 40/308 |
| 6,345,458 B1 * | 2/2002 | Garibian ......................... 40/506 |
| 2003/0221283 A1 | 12/2003 | Myers |
| 2005/0235537 A1 * | 10/2005 | Lee et al. ................... 40/607.03 |

FOREIGN PATENT DOCUMENTS
| DE | 8601412 U1 | 11/1986 |
| EP | 0212557 A1 | 3/1987 |
| EP | 1344705 A1 | 9/2003 |
| WO | 0057543 A1 | 9/2000 |

* cited by examiner

Primary Examiner — Joanne Silbermann
Assistant Examiner — Syed A Islam
(74) Attorney, Agent, or Firm — Laurence A. Greenberg; Werner H. Stemer; Ralph E. Locher

(57) ABSTRACT

The invention relates to a display element for attaching advertising to the handle of a shopping cart or the like. The display element includes a base body having a recess for inserting advertising media in a flat manner and fastening elements for fastening the display element on the handle bar, or the handle bar mounts, of a shopping cart. The display element is made of half shell-shaped parts, which in the joined state surround the handle bar, or the handle bar mount, in the shape of an enclosed box profile. The half shell-shaped parts are non-positively or positively connected to the handle bar.

7 Claims, 2 Drawing Sheets

DISPLAY ELEMENT FOR ATTACHING ADVERTISING TO THE HANDLE OF A SHOPPING CART

TECHNICAL FIELD

The invention relates to a display element for attaching advertisements to the handle of a shopping cart or the like, comprising a basic body having a recess for inserting an advertising medium such that it is flat, and fastening elements for fastening the display element to the handlebar or handlebar brackets of a shopping cart.

PRIOR ART

A display element of said type is known from WO 0057543 A1.

The display element described therein is universally highly suitable for being retroactively fitted to a handlebar of a shopping cart. The display element has, symmetrically in the region of the longitudinal axis, a channel-like recess which is open at one side. Fitting can be carried out easily and quickly. After the known display element is fitted, the handlebar runs in a well-integrated manner in said channel-like recess which is open at one side, and does not interfere in the use of the shopping cart.

It has been found that there is a demand for ever larger advertising surfaces, and for such large advertising surfaces, it is not possible to simply enlarge the form of the known display element in scalar fashion, because this can result in problems with regard to general stability and also because the display element which has been enlarged in scalar fashion can no longer be fitted to all types of shopping cart without interfering in the use of the shopping cart.

If the known display element is enlarged in scalar fashion, it correspondingly projects a considerable distance laterally at both sides of the handlebar. In a standard situation of use of the shopping cart, when the edge of the display element is gripped in order to push or pull the shopping cart, large forces are generated which can lead to damage occurring at the mechanically weakest point of the display element, specifically where the channel-like recess which is provided for receiving the handlebar runs.

Different types of shopping carts have different geometrical relationships with regard to the distance of the handlebar from moving parts of the shopping cart, for example the basket flap or child seat. It is correspondingly no longer possible for a display element which has been enlarged in scalar fashion to be fitted generally to all types of shopping cart in such a way that the handlebar can run in a recess symmetrically in the region of the longitudinal axis of the display element.

DISCLOSURE OF THE INVENTION

Technical Object

The object of the present invention is to create a display element which provides a large advertising surface, which is sufficiently stable and designed such that a further region in each case adjacent to the longitudinal axis can be used to receive the handlebar, and which can also be fitted quickly and easily.

Technical Solution

The considerations which led to the solution according to the invention embraced the realization that a display element which has a closed box profile which completely surrounds the handlebar in the assembled state has a corresponding degree of stability, and a display element is easy and simple to fit if it is composed of individual parts which in each case surround the handlebar for example in the manner of half-shells and are then placed in positively locking engagement. After the two half-shells are joined together, they form a dimensionally stable box-like profile, in the interior of which the handlebar runs.

Here, the box-like profile is shaped in the interior so as to tightly surround the handlebar and thereby produce good mechanical contact with the handlebar.

Advantageous Effects

By means of the design according to the invention of the new display element, it is possible to use display elements with a large surface on a multiplicity of types of shopping cart.

BRIEF DESCRIPTION OF THE DRAWINGS

The invention will be explained in more detail below on the basis of two drawings.

In the drawing:

FIG. 1 shows a side part 2 and the central part 3 of the display element 1 in a perspective illustration. The side part 2 and the central part 3 and also a further side part 2', represented here merely by an arrow, are pushed one inside the other on the handle of a shopping cart, and thereby form a stable unit.

Figure 1:
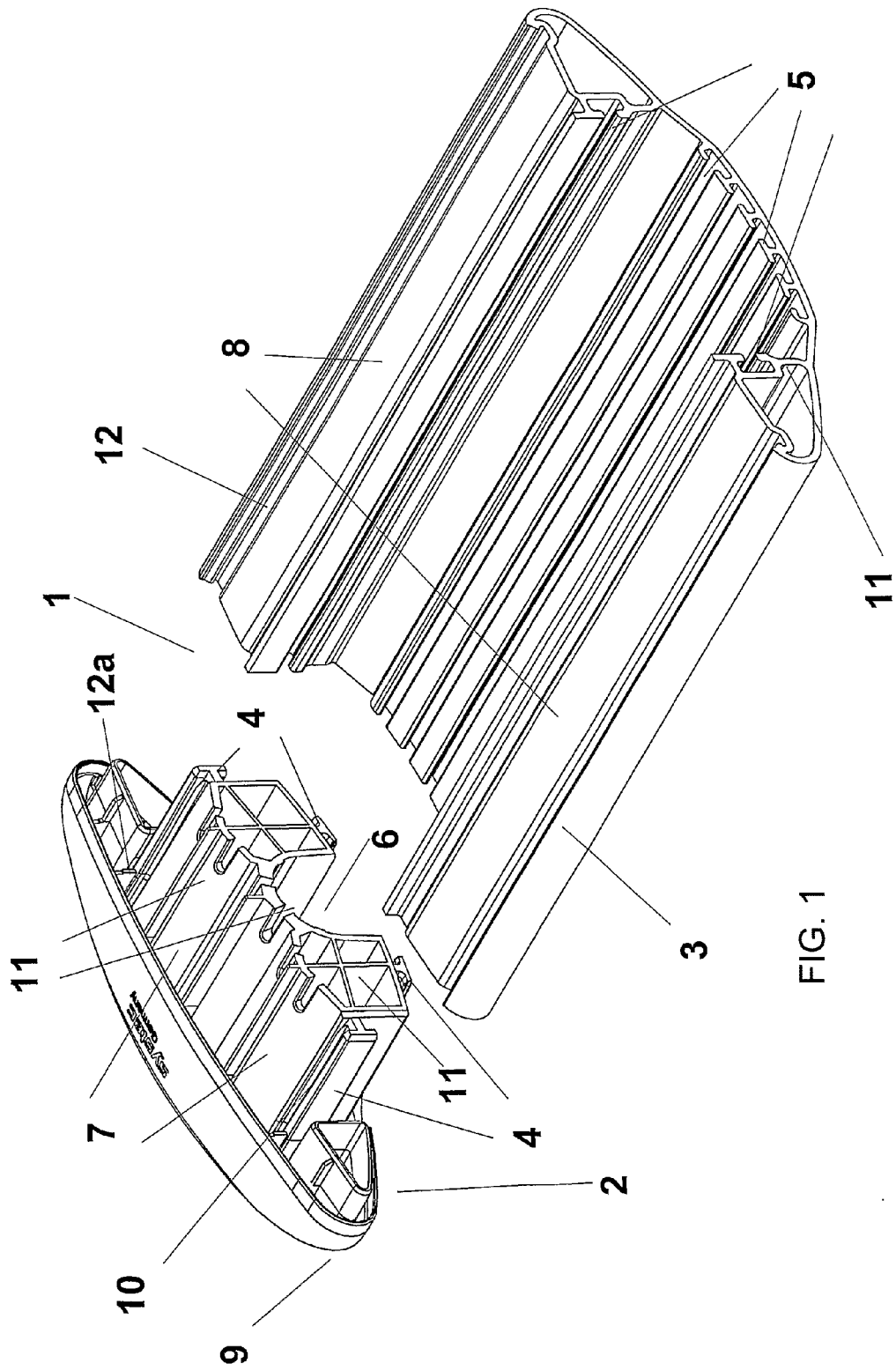
FIG. 1 shows individual parts of the display element.

The side parts 2 and 2' have dovetail-shaped webs 4 which can be pushed into corresponding grooves 5 of the central part. The webs 4 and the corresponding grooves 5 may also have any other profile which is suitable for producing a stable connection between the side parts 2, 2' and the central part 3. The side parts 2, 2' also have a recess 6 which can receive the handle of a shopping cart.

The display element 1 is fitted to the handle of a shopping cart firstly by placing the central part 3 on the handle of the shopping cart from below. The side part 2 is subsequently placed onto the handle of the shopping cart from above. The handle of the shopping cart is now situated in the recess 6.

The central part 3 and the side part 2 are now connected to one another by virtue of the webs 4 being pushed into the grooves 5. The unit, which is produced in this way, composed of side part 2 and central part 3 is held on the handle without further auxiliary means, which facilitates the subsequent fitting of the other side part 2'.

The side part 2' is pushed onto the central part 3 from the other side. As is the case with the side part 2, webs engage into grooves in order to produce a fixed connection.

In the example shown, the recess 6 in the side part 2 and 2' is illustrated as being precisely central. When the display element 1 is fully fitted, the handle of the shopping cart then runs symmetrically through the display element 1 in the region of the longitudinal axis.

For applications in which it is desirable for the handle of the shopping cart not to run centrally through the display element, it is provided that the recess 6 runs eccentrically in the side part. It is possible, for different types of shopping cart, to provide different side parts in which the recess 6 runs at a corresponding distance from the center. In this way, it is always possible for the display element 1 to be fitted in a manner suited to the specific type of shopping cart.

The handlebar then runs through the display element 1 asymmetrically in the region of the longitudinal axis. As a result of the possibility of varying the position of the recess in the side part 2 and 2', it is possible to position the display element in such a way that the edge cannot come into contact with moving functional parts, and that sufficient space is still provided for a child sitting in the child seat of the shopping cart.

In the assembled state, a stable profile composed of the side parts 2 and the central part 3 is produced by means of the web/groove connection. Forces acting on the edge 9 of the display element 1 are absorbed by the box-shaped profile, and only a short lever arm initially acts between the edge 9 and the side 10 of the box-shaped profile. To further increase stability, a plurality of struts 11 are provided in the side part 2 and in the central part 3.

The box-shaped profile is connected to the handlebar by means of a screw connection or clamped connection. Rotational locking is provided in this way. In the case of a handle with an oval cross section and a correspondingly likewise oval recess 6, the rotational locking is generated by positively locking engagement.

The side part 2 has an upper surface 7 and the central part 3 has two upper surfaces 8. In the assembled state, the surfaces 7 and 8 provide a rest surface for printed material. The printed material is protected from environmental influences by a transparent cover (not shown here).

A groove 12 is provided at the edge region of the central part, into which groove 12 the transparent cover engages. It is likewise also possible for the side part 2 to have a groove 12*a* into which the cover then engages.

To fit the transparent cover, the latter is firstly arched and placed onto the surfaces 8. Since the transparent cover assumes a planar form again on account of its elasticity, the edges of the transparent cover slide into the grooves 12 at the edge of the central part or alternatively under the grooves 12*a* on the side part. In this way, the transparent cover is securely connected to the display element 1 and simultaneously fixes the printable material. The printable material is now situated under the cover and is protected against removal.

Figure 2:
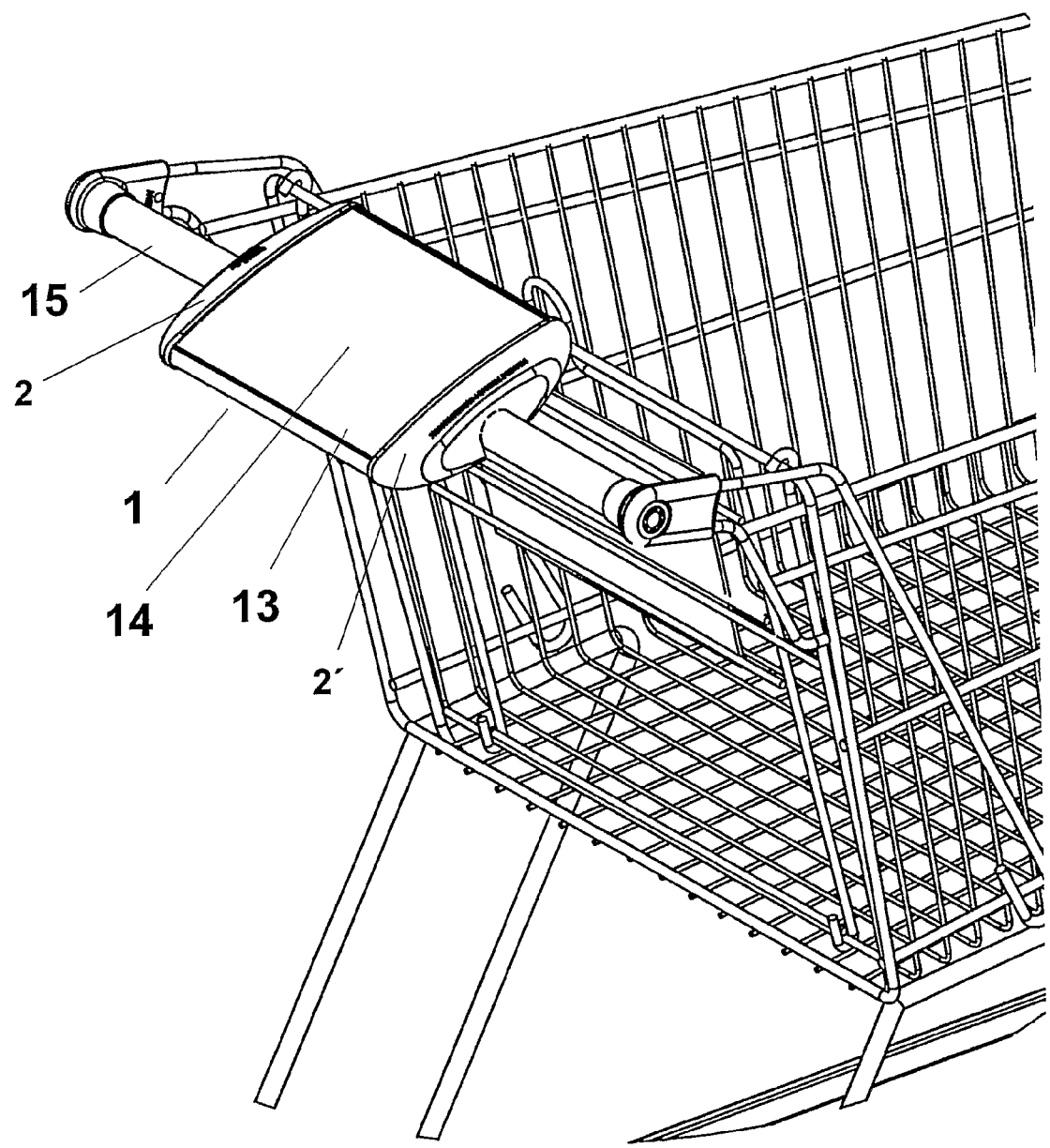
FIG. 2 shows the display element fully fitted on a shopping cart.

FIG. 2 shows the display element 1 in the fully fitted state on the handle 15 of a shopping cart 16. The transparent cover 13 under which the advertising surface 14 is situated is inserted substantially flush in the display element 1, and on account of the fact that the cover 13 engages into the grooves 12 or 12*a*, the cover 13 is well protected against willful removal.

INDUSTRIAL APPLICABILITY

The invention is industrially applicable in the field of advertising and information on a shopping cart, a luggage trolley or some other transport carriage.

The invention claimed is:

1. A display element for attaching advertisements to a shopping cart handlebar or a handlebar bracket, comprising:
a basic body having a recess configured for receiving a flat advertising medium, the basic body having a first half-shell shaped side part and a second half-shell shaped side part opposite the first half-shell shaped side part and a half-shell shaped central part disposed between the first and second half-shell shaped side parts which, in an assembled state thereof, define a mounting recess having a closed profile which surrounds the handlebar or the handlebar bracket, the closed profile having an interior which tightly surrounds the handlebar or the handlebar bracket and produces mechanical contact with the handlebar or handlebar bracket;
the first and second half-shell shaped side parts and the half-shell shaped central part being connected by webs which mate with corresponding grooves.

2. The display device according to claim 1, wherein the webs and grooves define a positive locking connection.

3. The display device according to claim 1, wherein said recess receives the handlebar or handlebar bracket in a positive locking engagement.

4. The display device according to claim 1, wherein the mounting recess is disposed coaxially with a central longitudinal axis of the basic body.

5. The display device according to claim 1, wherein the mounting recess is disposed offset from a central longitudinal axis of the basic body.

6. The display device according to claim 1, wherein the basic body is connected in a rotationally fixed manner to the handlebar or handlebar bracket by a screw connection.

7. The display device according to claim 1, wherein the webs and grooves have longitudinal axes which are parallel to a longitudinal axis of the handlebar.

* * * * *